UNITED STATES PATENT OFFICE.

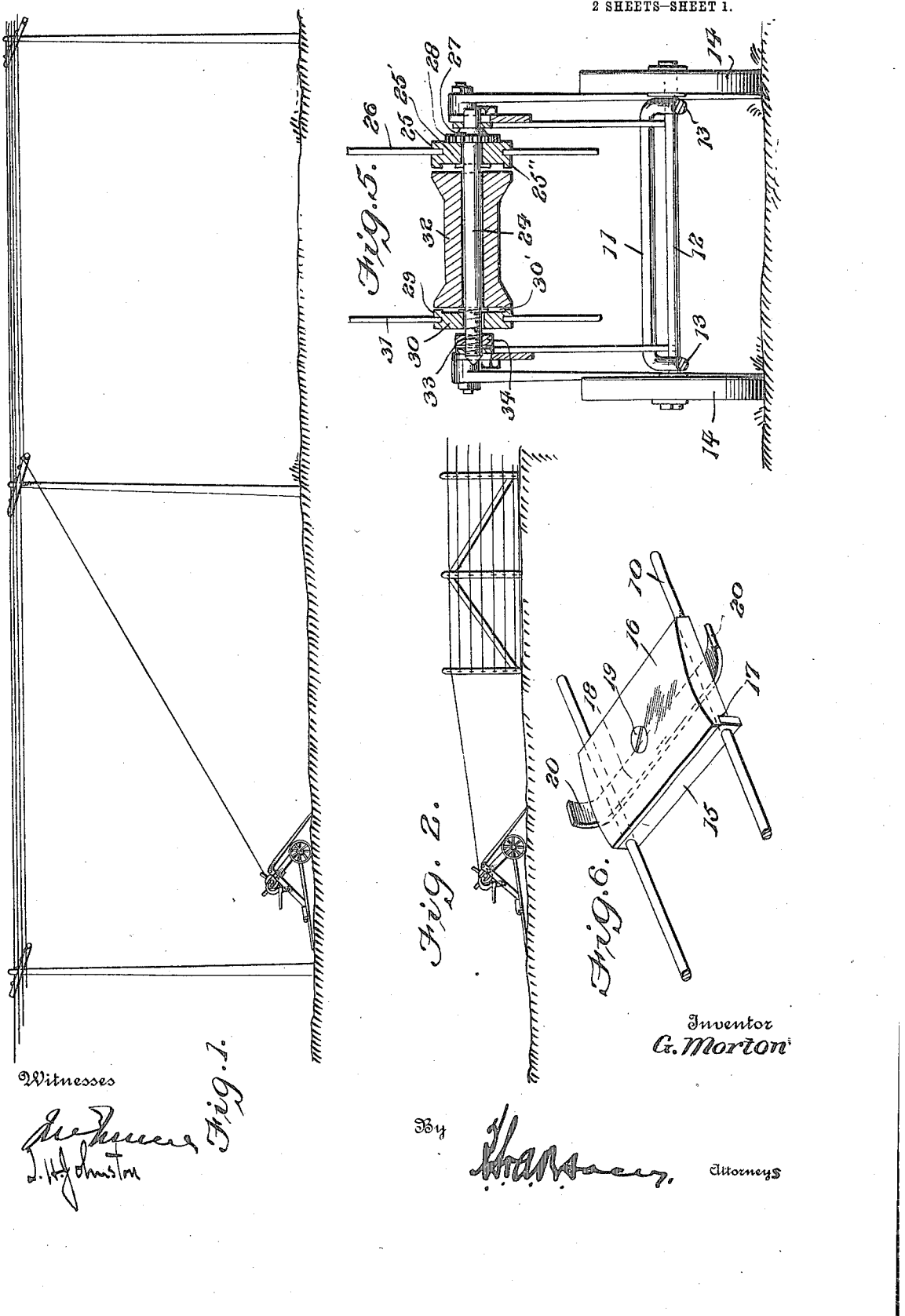

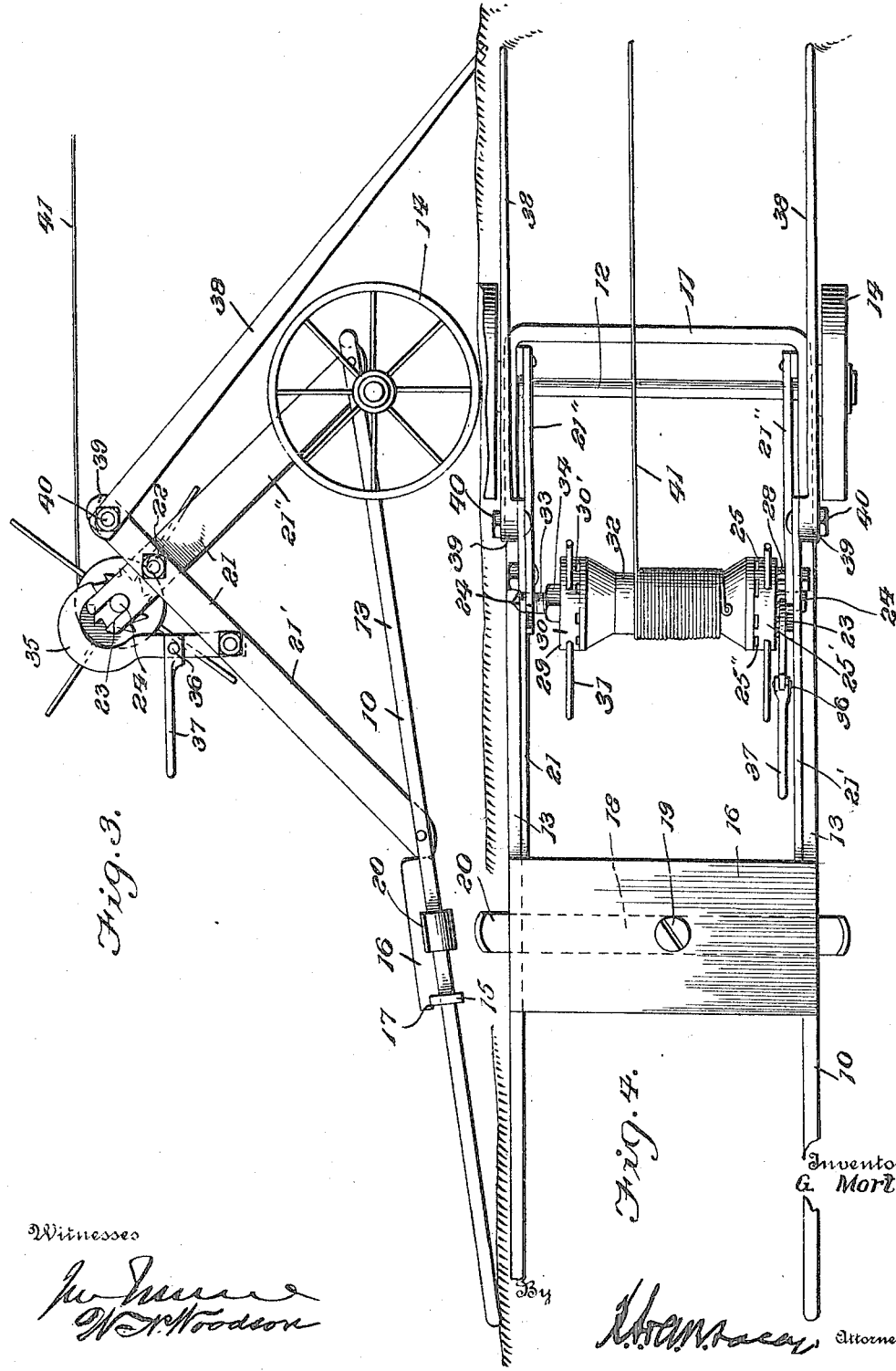

GEORGE MORTON, OF WEST GROVE, IOWA.

COMBINED REEL-CARRIAGE AND WIRE-STRETCHER.

1,135,041.  Specification of Letters Patent.  Patented Apr. 13, 1915.

Application filed February 12, 1914. Serial No. 818,330.

*To all whom it may concern:*

Be it known that I, GEORGE MORTON, citizen of the United States, residing at West Grove, in the county of Davis and State of Iowa, have invented certain new and useful Improvements in Combined Reel-Carriages and Wire-Stretchers, of which the following is a specification.

This invention relates to wire stringing devices particularly adapted for use in the erection of telegraph and telephone lines or in stringing fence wires.

The invention has for its object to provide a device adapted to transport a spool of wire as the wire is unwound for use and which may be positioned and used to stretch the wire as desired.

A further object of the invention is to provide a reel carriage which may be readily moved from place to place and in which the reel may be readily removed to either discharge or receive a new spool of wire.

The invention has as a further object to provide a device of the above described character which may be readily positioned to stretch the wire and which may with equal facility be used to rewind loose wire upon the reel.

A still further object of the invention is to provide a combined reel carriage and wire stretcher which may be operated by a single person to either stretch the wire or reel up or unreel wire upon the spool mounted upon the reel carriage.

With these and other objects in view, the invention will be more fully described, illustrated in the accompanying drawings, and then specifically pointed out in the claims which are attached to and form part of this application.

In the accompanying drawings—Figure 1 is a view showing my combined reel carriage and wire stretcher as used in connection with the stringing of telegraph or telephone wires, Fig. 2 is a fragmentary side elevation showing the invention as used for stringing fence wires, Fig. 3 is a side elevation showing the carriage in position for stretching wire, with the ground engaging arms thrown forward into operative position, Fig. 4 is a top plan view of the reel carriage with the reel mounted thereon, Fig. 5 is a transverse sectional view taken on the line 5—5 of Fig. 3, and Fig. 6 is a fragmentary perspective view of the platform mounted upon the frame of the reel carriage, showing the bracket which supports the ground engaging arms mounted upon the carriage when folded into inoperative position.

Referring to the drawings wherein similar reference characters designate similar parts throughout the several views, the numeral 10 designates the frame of my improved reel carriage which is preferably formed from a length of suitable metallic rod bent into substantially U-shaped form as shown. Secured to the frame adjacent the cross bar 11 thereof is a transversely extending axle 12 on the extremities of which are journaled exteriorly of the side portions 13 of the frame, supporting wheels 14. Extending between the side portions 13 of the frame, forwardly of the axle 12 is a brace 15, such brace maintaining the free extremities of the side portions 13 of the frame in proper spaced relation said free extremities forming shafts.

Mounted upon the side portions 13 of the frame adjacent the brace 15 is a platform 16. The forward edge of the platform 16 is cut away as at 17 to extend over the upper edge of the brace 15, to rest thereon. A bracket 18 which is preferably formed from a strip of suitable metal is secured to the platform 16 in any suitable manner as by a bolt 19 which extends through the platform and through the bracket 18. The bracket 18 is disposed beneath the side portions 13 of the frame, the extremities 20 thereof extending beyond the longitudinal ends of the platform 16 and being bent upwardly for a purpose which will be hereinafter described.

Mounted upon the frame 10 intermediate the platform 16 and the cross bar 11 are oppositely disposed pairs of supporting members 21, each including downwardly diverging arms 21' and 21" having their converging extremities connected above the frame preferably by a bolt 22 and being bolted or otherwise secured to the side portions 13 of the frame at their divergent extremities. The arm 21" of each of said supporting members 21 is disposed to extend rearwardly of the frame 10 toward the platform 16, each of said rearwardly extending arms being longitudinally slotted at its free extremity as at 23.

Mounted for rotation upon the supporting members 21 and journaled within the slots 23 formed in the upper free extremities thereof, is a reel frame which includes a shaft 24 the extremities of which are received within the slots 23. Permanently secured to the shaft 24 adjacent one end thereof is a hand-wheel 25 formed with a hub 25' having a plurality of radially extending spokes 26 seated therein. The hub 25' is formed with a laterally extending reduced extension 27 which is provided with ratchet teeth 28, the purpose of which will be presently explained.

Loosely mounted adjacent the opposite extremity of the shaft 24 is a hand-wheel 29 similar in construction to the hand-wheel just described, said last named hand-wheel including a hub 30 which is provided with a central bore adapted to receive the shaft 24, and extending from the hub 30 are a plurality of radial spokes 31.

The reel frame is loosely mounted upon the supporting members 21 and can be removed from the reel carriage. An empty spool such as is shown at 32 or a spool of wire may as a consequence be easily positioned upon the shaft 24 by removing the reel from the carriage and as shown such spool is disposed intermediate the hand-wheels 25 and 29, the hand-wheel 29 being removed from the shaft 24, to permit the mounting of the spool 32.

One extremity of the shaft 24 is screw threaded as at 33 and is designed to receive a jam nut 34 which is screwed down against the hub 30 of the hand-wheel 29, thus clamping the spool 32 upon the reel intermediate the hand-wheels mounted thereon, the hubs 25' and 30 of said wheels being preferably provided upon their inner faces with laterally extending lugs 25'' and 30' adapted to engage the end faces of the spool. Movement of the spool 32 upon the shaft 24 independently of the hand-wheels carried by the shaft is thus prevented. Pivotally secured to one of the supporting members 21 adjacent the upper extremity thereof is a pawl 35, the free extremity of which is inwardly curved and is designed to engage the ratchet teeth 28 formed on the reduced extensions 27 of the hub 25'', this hub being fixed upon the shaft 24. Pivotally connected as at 36 to the pawl 35 is a hand lever 37 by which the pawl 35 may be operated to engage or disengage the ratchet teeth 28.

Pivotally mounted upon the free extremities of the arms 21', substantially in alinement with the slots 23 formed in the free extremities of the arms 21'' are ground engaging arms 38. Each of said arms is formed at one end with an enlarged head 39 transversely apertured to receive bolts 40. The arms 38 are of sufficient length to extend forwardly of the reel carriage to engage the ground and thus prevent rearward movement of the carriage. When it is desired to move the carriage from place to place or when the arms 38 are not in use, they may be swung back upon their pivots to be supported in inoperative position by the upwardly extending extremities 20 of the bracket 18.

From the foregoing description, it will be clear that as the carriage is moved along, the wire upon the spool carried by the reel, said wire being conventionally shown at 41, will be paid out, the shaft 24 revolving upon the supporting members 21 as the spool is rotated. To stretch the wire so paid out, the ground engaging arms 38 are swung forwardly into operative position and the hand-wheels operated to rewind the wire, thus drawing it taut. The spool of wire being wedged between the hand-wheels 25 and 29 by the jam nut 34, independent movement of the spool will be prevented, and it will therefore be clear that as the hand-wheels are turned the wire will be rewound upon the spool. The wire being stretched taut, the pawl 35 is engaged with the ratchet teeth 28 to thus hold the reel against movement, when the wire so stretched may be secured.

In the practical use of my invention, the person operating the reel may stand upon the platform 16, thus having easy access to the spokes of the hand-wheels 25 and 29. It will be clear that after stretching one portion of the wire carried upon the spool, the carriage may be moved along without disturbing the ground engaging arms 38 when the stretching operation may be again repeated.

It will also be noted that my improved device may be used to rewind wire, in taking down fences, or telephone or telegraph wires upon suitable spools. To effect this operation the ground engaging arms 38 are swung back to engage the bracket 18, thus permitting rearward movement of the carriage. One extremity of the wire is secured to an empty spool mounted upon the shaft 24; then by standing upon the platform 16 and operating the hand-wheels 25 and 29, the carriage will be drawn along to wind the wire upon the spool.

It will be noted that a single person may operate my combined reel carriage and wire stretcher, to either stretch the wire or rewind loose wire upon the reel, this feature of my invention being of obvious advantage. It will also be clear that the reel may be readily removed from the carriage to permit new spools to be positioned upon the reel or to permit the removal of spools therefrom and that the invention may be used with equal facility in stringing fence wires or in stringing telephone or telegraph wires.

Particular attention is directed to the disposition of the reel upon the carriage and its arrangement with relation to the points of pivotal movement of the arms 38 connected to the supporting members 21 and with relation to the pivotal axis of the frame 10 upon the supporting wheels 14. When using the device to stretch wire, tension upon the wire 42, tending to pull the carriage rearwardly, will have a tendency to tilt the forward extremity of the frame upwardly, thus forcing the arms 38 into engagement with the ground and preventing the slipping of the carriage. As will be obvious stress upon the reel will be communicated through the arms 21″ supporting the reel to the frame 10 rearwardly of the axle 12. Thus, the inner extremity of the frame will be forced downwardly, causing the upper extremities of the arms 38 to move in an arcuate path, such arcuate movement at this point having a tendency to lift the carriage upwardly upon the arms 38, said arms pivoting at their free extremities in engagement with the ground. Thus, the greater the tension upon the wire 42 the more firmly will the arms 38 be forced into engagement with the ground.

Having thus described my invention what is claimed as new is:

1. A device of the character described including a frame having supporting wheels operatively connected thereto adjacent one extremity, supporting members carried by the frame adjacent said supporting wheels, each of said members including arms converging above the frame and secured together adjacent their upper extremities, the arms of the said members being arranged in pairs, a reel carried by said members and operatively connected with one pair of oppositely disposed arms thereof, and ground engaging arms pivotally connected to the opposite pair of oppositely disposed arms of said members in advance of the horizontal axis of the reel and rearwardly of the pivotal axis of the supporting wheels.

2. A device of the character described including a frame having supporting wheels operatively connected thereto, supporting members carried by the frame, each of said members including arms converging above the frame and disposed to cross each other adjacent their upper extremities, the arms of the said members being arranged in pairs, a reel carried by said members and operatively connected to one pair of oppositely disposed arms of said members at the upper extremities thereof, and ground engaging arms pivotally connected to the upper extremities of the opposite pair of oppositely disposed arms of said members in advance of the horizontal axis of the reel and rearwardly of the pivotal axis of the supporting wheels.

3. In a device of the character described, a frame including supporting wheels, a reel mounted upon the frame, ground engaging arms pivotally mounted upon the frame, and a platform mounted in front of the reel on the supporting frame, said platform including a bracket engaging the frame and projecting laterally beyond the sides thereof to engage said ground engaging arms when swung to inoperative position.

In testimony whereof I affix my signature in presence of two witnesses.

GEORGE MORTON. [L. S.]

Witnesses:
  C. E. Fry,
  John F. Scarborough.

Copies of this patent may be obtained for five cents each, by addressing the "Commissioner of Patents Washington, D. C."